US00RE45415E

(19) United States
(12) Reissued Patent
Senkiw

(10) Patent Number: US RE45,415 E
(45) Date of Reissued Patent: Mar. 17, 2015

(54) FLOW-THROUGH OXYGENATOR

(75) Inventor: James Andrew Senkiw, Minneapolis, MN (US)

(73) Assignee: Oxygenator Water Technologies, Inc., St. Louis Park, MN (US)

(21) Appl. No.: 13/247,241

(22) Filed: Sep. 28, 2011

Related U.S. Patent Documents

Reissue of:
(64) Patent No.: 7,670,495
Issued: Mar. 2, 2010
Appl. No.: 12/023,431
Filed: Jan. 31, 2008

U.S. Applications:
(60) Division of application No. 10/732,326, filed on Dec. 10, 2003, now Pat. No. 7,396,441, which is a continuation-in-part of application No. 10/372,017, filed on Feb. 21, 2003, now Pat. No. 6,689,262.

(60) Provisional application No. 60/358,534, filed on Feb. 22, 2002.

(51) Int. Cl.
*C02F 1/48* (2006.01)
*C02F 1/00* (2006.01)
(Continued)

(52) U.S. Cl.
USPC ..... 210/739; 204/157.15; 204/245; 204/232; 204/628; 204/600; 210/600; 210/243; 210/153; 422/22; 422/186; 422/186.04

(58) Field of Classification Search
USPC ..... 210/739, 746, 748.01, 748.16, 748.15, 210/748.17, 748.19, 749, 757, 167.21; 422/22, 27, 28, 129, 186, 186.04, 422/186.03, 186.07, 186.01, 186.1, 186.15, 422/186.16, 186.21, 616, 243, 305, 308; 204/155, 157.15, 157.5, 164, 176, 178, 204/450, 554, 193, 194, 260, 272, 280, 277, 204/278.5, 287, 288, 288.1, 288.2, 230.2; 205/701, 628, 633, 742, 756, 757; 22/192, 321.7, 1; 119/263
See application file for complete search history.

(56) References Cited

U.S. PATENT DOCUMENTS 4,071,447 A 1/1978 Ramirez
4,179,347 A 12/1979 Krause et al.
(Continued)

FOREIGN PATENT DOCUMENTS

EP 0723936 A2 7/1996
GB 1 522 188 * 8/1978
(Continued)

OTHER PUBLICATIONS

"Effect of Oxygenated Water on the Growth & Biomass Development of Seedless Cucumbers and Tomato Seedlings under Greenhouse Conditions", Project Report: Seair Diffusion Systems, [Online]. Retrieved from the Internet: <URL: http://www.seair.ca/Pages/pdfs/DrMirzaReport.pdf>, (2003), 5 pgs.
(Continued)

*Primary Examiner* — Walter D Griffin
*Assistant Examiner* — Cameron J Allen
(74) *Attorney, Agent, or Firm* — Schwegman Lundberg & Woessner, P.A.

(57) ABSTRACT

An oxygen emitter which is an electrolytic cell is disclosed. When the anode and cathode are separated by a critical distance, very small microbubbles and nanobubbles of oxygen are generated. The very small oxygen bubbles remain in suspension, forming a solution supersaturated in oxygen. A flow-through model for oxygenating flowing water is disclosed. The use of supersaturated water for enhancing the growth of plants is disclosed. Methods for applying supersaturated water to plants manually, by drip irrigation or in hydroponic culture are described. The treatment of waste water by raising the dissolved oxygen with the use of an oxygen emitter is disclosed.

16 Claims, 8 Drawing Sheets

(51) Int. Cl.
*C02F 1/02* (2006.01)
*C02F 1/04* (2006.01)

(56) References Cited

U.S. PATENT DOCUMENTS

| | | | | | |
|---|---|---|---|---|---|
| 4,219,417 | A | * | 8/1980 | Ramirez | 210/707 |
| 4,225,401 | A | | 9/1980 | Divisek et al. | |
| 4,252,856 | A | | 2/1981 | Sara | |
| 4,257,352 | A | | 3/1981 | Habegger | |
| 4,587,001 | A | | 5/1986 | Cairns et al. | |
| 5,015,354 | A | | 5/1991 | Nishiki et al. | |
| 5,049,252 | A | * | 9/1991 | Murrell | 204/268 |
| 5,148,772 | A | | 9/1992 | Kirschbaum | |
| 5,336,399 | A | * | 8/1994 | Kajisono | 210/170.02 |
| 5,389,214 | A | * | 2/1995 | Erickson et al. | 205/701 |
| 5,500,131 | A | * | 3/1996 | Metz | 210/705 |
| 5,534,143 | A | | 7/1996 | Portier et al. | |
| 5,728,287 | A | | 3/1998 | Hough et al. | |
| 5,982,609 | A | | 11/1999 | Evans | |
| 6,110,353 | A | | 8/2000 | Hough | |
| 6,171,469 | B1 | | 1/2001 | Hough et al. | |
| 6,296,756 | B1 | * | 10/2001 | Hough et al. | 205/744 |
| 6,315,886 | B1 | | 11/2001 | Zappi | |
| 6,328,875 | B1 | | 12/2001 | Zappi et al. | |
| 6,394,429 | B2 | | 5/2002 | Gañan-Càlvo | |
| 6,419,815 | B1 | * | 7/2002 | Chambers | 205/628 |
| 6,478,949 | B1 | | 11/2002 | Hough et al. | |
| 6,524,475 | B1 | | 2/2003 | Herrington et al. | |
| 6,689,262 | B2 | * | 2/2004 | Senkiw | 204/278.5 |
| 7,396,441 | B2 | * | 7/2008 | Senkiw | 204/278 |
| 7,628,912 | B2 | * | 12/2009 | Yamasaki et al. | 210/150 |
| 2002/0074237 | A1 | | 6/2002 | Takesako et al. | |
| 2003/0091469 | A1 | * | 5/2003 | Kondo et al. | 422/23 |
| 2003/0164306 | A1 | | 9/2003 | Senkiw | |
| 2004/0118701 | A1 | * | 6/2004 | Senkiw | 205/633 |
| 2006/0054205 | A1 | * | 3/2006 | Yabe et al. | 134/184 |
| 2006/0150491 | A1 | | 7/2006 | Senkiw | |
| 2007/0187262 | A1 | * | 8/2007 | Field et al. | 205/742 |
| 2008/0202995 | A1 | | 8/2008 | Senkiw | |

FOREIGN PATENT DOCUMENTS

| | | | | | |
|---|---|---|---|---|---|
| GB | 1522188 | A | | 8/1978 | |
| KR | 940003935 | a1 | * | 12/1991 | A01K 63/04 |
| WO | WO 99/39561 | | | 8/1999 | |
| WO | WO-9939561 | A1 | | 8/1999 | |
| WO | WO-0189997 | A2 | | 11/2001 | |
| WO | WO-03072507 | A1 | | 9/2003 | |

OTHER PUBLICATIONS

Mohyuddin Mirza et al., "Effect of Oxygenated Water on the Growth & Biomass Development of Seedless Cucumbers and Tomato Seedlings under Greenhouse Conditions," Seair Diffusion Systems, 2003, 5 pages, www.seair.ca.

* cited by examiner

*Fig. 8* Time vs D.O.
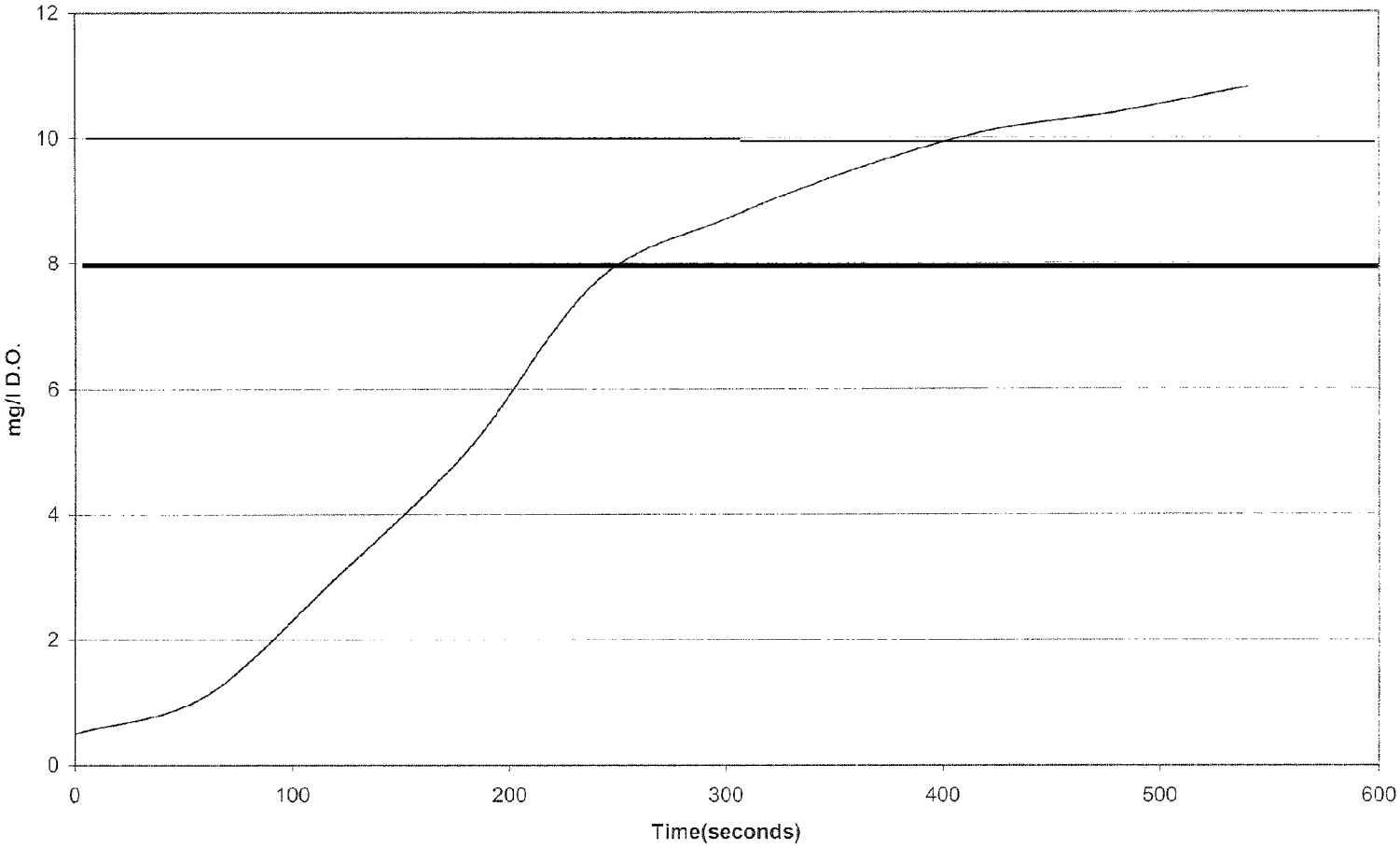

FLOW-THROUGH OXYGENATOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application is a division of application Ser. No. 10/732,326 filed Dec. 10, 2003 *now U.S. Pat. No. 7,396,441*, which in turn is a continuation-in-part of application Ser. No. 10/372,017, filed Feb. 21, 2003, now U.S. Pat. No. 6,689,262, which claims the benefit of U.S. Provisional Application No. 60/358,534, filed Feb. 22, 2002, each of which is hereby fully incorporated herein by reference.

FIELD OF THE INVENTION

This invention relates to the electrolytic generation of microbubbles of oxygen for increasing the oxygen content of flowing water. This invention also relates to the use of super-oxygenated water to enhance the growth and yield of plants. The flow-through model is useful for oxygenating water for hydroponic plant culture, drip irrigation and waste water treatment.

BACKGROUND OF THE INVENTION

Many benefits may be obtained through raising the oxygen content of aqueous media. Efforts have been made to achieve higher saturated or supersaturated oxygen levels for applications such as the improvement of water quality in ponds, lakes, marshes and reservoirs, the detoxification of contaminated water, culture of fish, shrimp and other aquatic animals, biological culture and hydroponic culture. For example, fish held in a limited environment such as an aquarium, a bait bucket or a live hold tank may quickly use up the dissolved oxygen in the course of normal respiration and are then subject to hypoxic stress, which can lead to death. A similar effect is seen in cell cultures, where the respiring cells would benefit from higher oxygen content of the medium. Organic pollutants from agricultural, municipal and industrial facilities spread through the ground and surface water and adversely affect life forms. Many pollutants are toxic, carcinogenic or mutagenic. Decomposition of these pollutants is facilitated by oxygen, both by direct chemical detoxifying reactions or by stimulating the growth of detoxifying microflora. Contaminated water is described as having an increased biological oxygen demand (BOD) and water treatment is aimed at decreasing the BOD so as to make more oxygen available for fish and other life forms.

The most common method of increasing the oxygen content of a medium is by sparging with air or oxygen. While this is a simple method, the resulting large bubbles produced simply break the surface and are discharged into the atmosphere. Attempts have been made to reduce the size of the bubbles in order to facilitate oxygen transfer by increasing the total surface area of the oxygen bubbles. U.S. Pat. No. 5,534,143 discloses a microbubble generator that achieves a bubble size of about 0.10 millimeters to about 3 millimeters in diameter. U.S. Pat. No. 6,394,429 ("the '429 patent") discloses a device for producing microbubbles, ranging in size from 0.1 to 100 microns in diameter, by forcing air into the fluid at high pressure through a small orifice.

When the object of generating bubbles is to oxygenate the water, either air, with an oxygen content of about 21%, or pure oxygen may be used. The production of oxygen and hydrogen by the electrolysis of water is well known. A current is applied across an anode and a cathode which are immersed in an aqueous medium. The current may be a direct current from a battery or an AC/DC converter from a line. Hydrogen gas is produced at the cathode and oxygen gas is produced at the anode. The reactions are:

| | |
|---|---|
| AT THE CATHODE: | $4H_2O + 4e^- \rightarrow 4OH^- + 2H_2$ |
| AT THE ANODE: | $2H_2O \rightarrow O_2 + 4H^+ + 4e^-$ |
| NET REACTION: | $6H_2O \rightarrow 4OH^- + 4H^+ ++ 2H_2 + O_2$ |

286 kilojoules of energy is required to generate one mole of oxygen.

The gasses form bubbles which rise to the surface of the fluid and may be collected. Either the oxygen or the hydrogen may be collected for various uses. The "electrolytic water" surrounding the anode becomes acidic while the electrolytic water surrounding the cathode becomes basic. Therefore, the electrodes tend to foul or pit and have a limited life in these corrosive environments.

Many cathodes and anodes are commercially available. U.S. Pat. No. 5,982,609 discloses cathodes comprising a metal or metallic oxide of at least one metal selected from the group consisting of ruthenium, iridium, nickel, iron, rhodium, rhenium, cobalt, tungsten, manganese, tantalum, molybdenum, lead, titanium, platinum, palladium and osmium. Anodes are formed from the same metallic oxides or metals as cathodes. Electrodes may also be formed from alloys of the above metals or metals and oxides co-deposited on a substrate. The cathode and anodes may be formed on any convenient support in any desired shape or size. It is possible to use the same materials or different materials for both electrodes. The choice is determined according to the uses. Platinum and iron alloys ("stainless steel") are often preferred materials due to their inherent resistance to the corrosive electrolytic water. An especially preferred anode disclosed in U.S. Pat. No. 4,252,856 comprises vacuum deposited iridium oxide.

Holding vessels for live animals generally have a high population of animals which use up the available oxygen rapidly. Pumps to supply oxygen have high power requirements and the noise and bubbling may further stress the animals. The available electrolytic generators likewise have high power requirements and additionally run at high voltages and produce acidic and basic water which are detrimental to live animals. Many of the uses of oxygenators, such as keeping bait or caught fish alive, would benefit from portable devices that did not require a source of high power. The need remains for quiet, portable, low voltage means to oxygenate water.

It has also been known that plant roots are healthier when oxygenated water is applied. It is thought that oxygen inhibits the growth of deleterious fungi. The water sparged with air as in the '429 patent was shown to increase the biomass of hydroponically grown cucumbers and tomatoes by about 15%.

The need remains for oxygenator models suitable to be placed in-line in water distribution devices so as to be applied to field as well as hydroponic culture.

SUMMARY OF THE INVENTION

This invention provides an oxygen emitter which is an electrolytic cell which generates very small microbubbles and nanobubbles of oxygen in an aqueous medium, which bubbles are too small to break the surface tension of the medium, resulting in a medium supersaturated with oxygen.

The electrodes may be a metal or oxide of at least one metal selected from the group consisting of ruthenium, iridium, nickel, iron, rhodium, rhenium, cobalt, tungsten, manganese, tantalum, molybdenum, lead, titanium, platinum, palladium and osmium or oxides thereof. The electrodes may be formed into open grids or may be closed surfaces. The most preferred cathode is a stainless steel mesh. The most preferred mesh is a {fraction (1/16)} inch grid. The most preferred anode is platinum and iridium oxide on a support. A preferred support is titanium.

In order to form microbubbles and nanobubbles, the anode and cathode are separated by a critical distance. The critical distance ranges from 0.005 inches to 0.140 inches. The preferred critical distance is from 0.045 to 0.060 inches.

Models of different size are provided to be applicable to various volumes of aqueous medium to be oxygenated. The public is directed to choose the applicable model based on volume and power requirements of projected use. Those models with low voltage requirements are especially suited to oxygenating water in which animals are to be held.

Controls are provided to regulate the current and timing of electrolysis.

A flow-through model is provided which may be connected in-line to a watering hose or to a hydroponic circulating system. The flow-through model can be formed into a tube with triangular cross-section. In this model, the anode is placed toward the outside of the tube and the cathode is placed on the inside, contacting the water flow. Alternatively, the anodes and cathodes may be in plates parallel to the long axis of the tube, or may be plates in a wafer stack. Alternately, the electrodes may be placed in a side tube ("T" model) out of the direct flow of water. Protocols are provided to produce superoxygenated water at the desired flow rate and at the desired power usage. Controls are inserted to activate electrolysis when water is flowing and deactivate electrolysis at rest.

This invention includes a method to promote growth and increase yield of plants by application of superoxygenated water. The water treated with the emitter of this invention is one example of superoxygenated water. Plants may be grown in hydroponic culture or in soil. The use of the flow-through model for drip irrigation of crops and waste water treatment is disclosed.

BRIEF DESCRIPTION OF THE DRAWINGS

FIG. 7 shows an oxygenation chamber suitable for flow-through applications.

FIG. 8 is a graph showing the oxygenation of waste water.

DETAILED DESCRIPTION OF THE INVENTION

Definitions

Figure 1B:
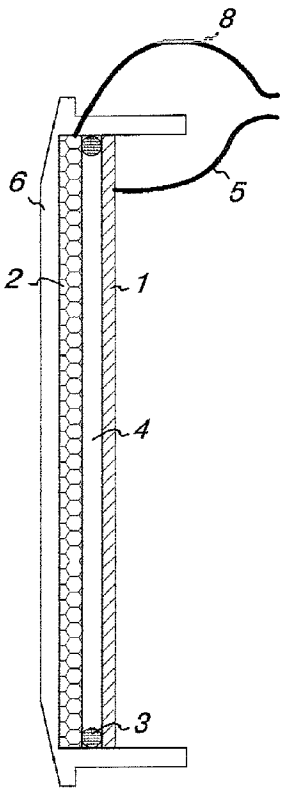
FIG. 1 is the $O_2$ emitter of the invention.

For the purpose of describing the present invention, the following terms have these meanings:

"Critical distance" means the distance separating the anode and cathode at which evolved oxygen forms microbubbles and nanobubbles.

"Critical distance" means the distance separating the anode and cathode at which evolved oxygen forms microbubbles and nanobubbles.

"$O_2$ emitter" means a cell comprised of at least one anode and at least one cathode separated by the critical distance.

"Metal" means a metal or an alloy of one or more metals.

"Microbubble" means a bubble with a diameter less than 50 microns.

"Nanobubble" means a bubble with a diameter less than that necessary to break the surface tension of water. Nanobubbles remain suspended in the water, giving the water an opalescent or milky appearance.

"Supersaturated" means oxygen at a higher concentration than normal calculated oxygen solubility at a particular temperature and pressure.

"Superoxygenated water" means water with an oxygen content at least 120% of that calculated to be saturated at a temperature.

"Water" means any aqueous medium with resistance less than one ohm per square centimeter; that is, a medium that can support the electrolysis of water. In general, the lower limit of resistance for a medium that can support electrolysis is water containing more than 2000 ppm total dissolved solids.

The present invention produces microbubbles and nanobubbles of oxygen via the electrolysis of water. As molecular oxygen radical (atomic weight 8) is produced, it reacts to form molecular oxygen, $O_2$. In the special dimensions of the invention, as explained in more detail in the following examples, $O_2$ forms bubbles which are too small to break the surface tension of the fluid. These bubbles remain suspended indefinitely in the fluid and, when allowed to build up, make the fluid opalescent or milky. Only after several hours do the bubbles begin to coalesce on the sides of the container and the water clears. During that time, the water is supersaturated with oxygen. In contrast, the $H_2$ formed readily coalesces into larger bubbles which are discharged into the atmosphere, as can be seen by bubble formation at the cathode.

The first objective of this invention was to make an oxygen emitter with low power demands, low voltage and low current for use with live animals. For that reason, a small button emitter was devised. The anode and cathode were set at varying distances. It was found that electrolysis took place at very short distances before arcing of the current occurred. Surprisingly, at slightly larger distances, the water became milky and no bubbles formed at the anode, while hydrogen continued to be bubbled off the cathode. At distance of 0.140 inches between the anode and cathode, it was observed that the oxygen formed bubbles at the anode. Therefore, the critical distance for microbubble and nanobubble formation was determined to be between 0.005 inches and 0.140 inches.

EXAMPLE 1

Oxygen Emitter

Figure 1A:
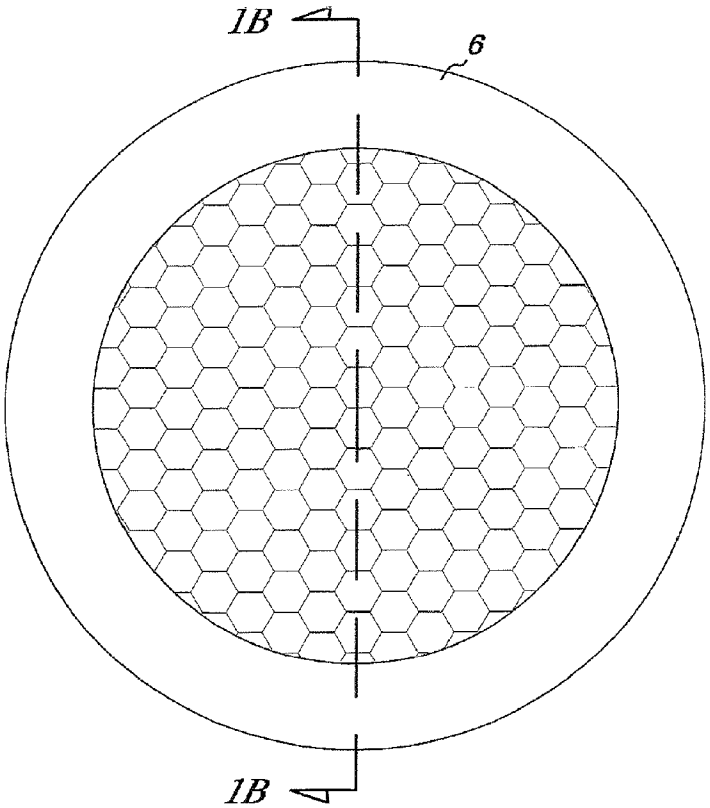
Figure 2B:
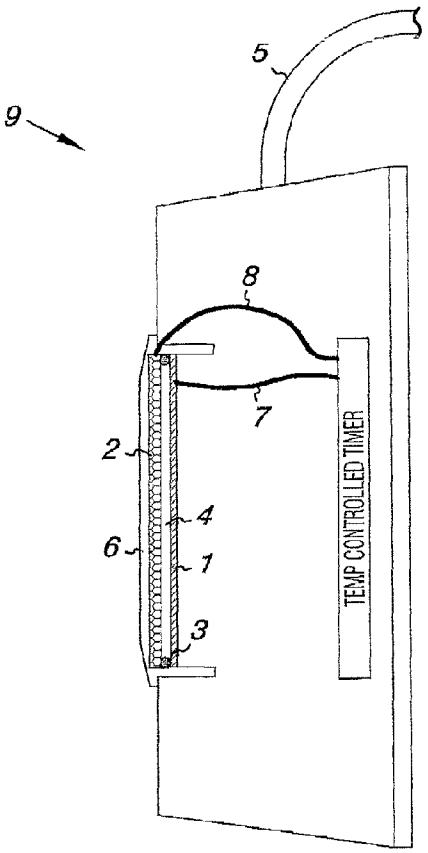
FIG. 2 is an assembled device.
Figure 2A:
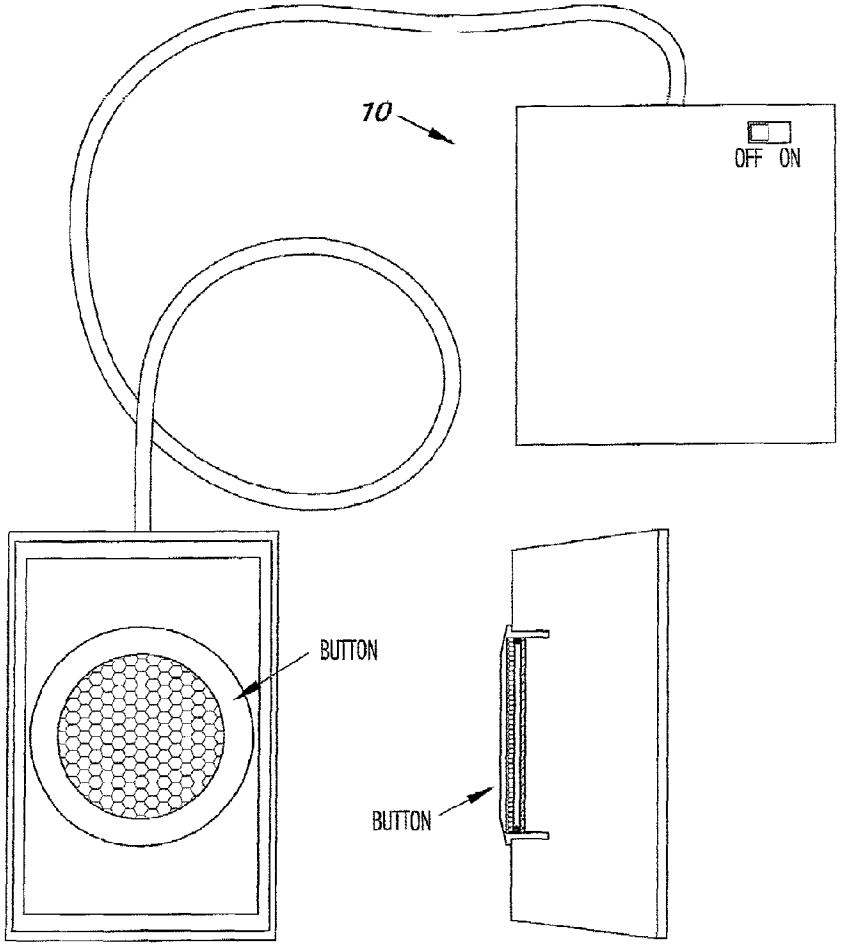

As shown in FIG. 1, the oxygen evolving anode 1 selected as the most efficient is an iridium oxide coated single sided sheet of platinum on a support of titanium (Eltech, Fairport Harbor, Ohio). The cathode 2 is a (fraction (1/16)} inch mesh (size 8 mesh) marine stainless steel screen. The anode and cathode are separated by a non-conducting spacer 3 containing a gap 4 for the passage of gas and mixing of anodic and cathodic water and connected to a power source through a connection point 5. FIG. 2 shows a plan view of the assembled device. The $O_2$ emitter 6 with the anode connecting wire 7 and the cathode connecting wire 8 is contained in an enclosure 9, connected to the battery compartment 10. The spacer thickness is critical as it sets the critical distance. It must be of sufficient thickness to prevent arcing of the current, but thin enough to separate the electrodes by no more than 0.140 inches. Above that thickness, the power needs are higher and the oxygen bubbles formed at higher voltage will coalesce and escape the fluid. Preferably, the spacer is from 0.005 to 0.075 inches thick. At the lower limits, the emitter tends to foul more quickly. Most preferably, the spacer is about 0.050 inches thick. The spacer may be any nonconductive material such as nylon, fiberglass, Teflon®, polymer or other plastic. Because of the criticality of the space distance, it is preferable to have a non-compressible spacer. It was found that Buna, with a durometer measure of 60 was not acceptable due to decomposition. Viton, a common fluoroelastomer, has a durometer measure of 90 and was found to hold its shape well.

In operation, a small device with an $O_2$ emitter 1.485 inches in diameter was driven by 4AA batteries. The critical distance was held at 0.050 inches with a Viton spacer. Five gallons of water became saturated in seven minutes. This size is suitable for raising oxygen levels in an aquarium or bait bucket.

Figure 3:
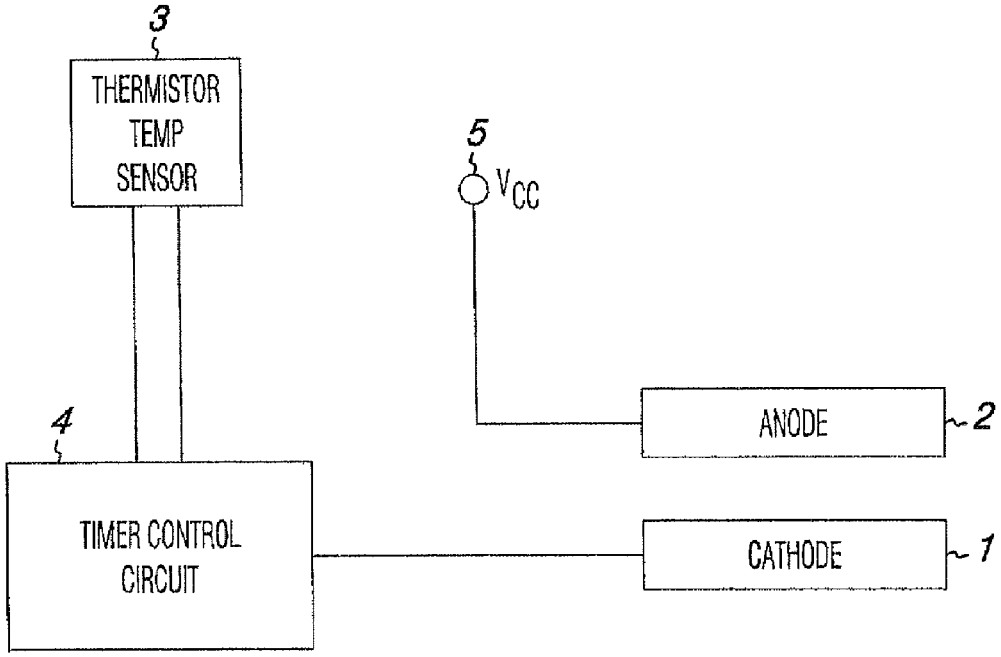
FIG. 3 is a diagram of the electronic controls of the $O_2$ emitter.

It is convenient to attach a control circuit which comprises a timer that is thermostatically controlled by a temperature sensor which determines the off time for the cathode. When the temperature of the solution changes, the resistance of the thermistor changes, which causes an off time of a certain duration. In cool water, the duration is longer so in a given volume, the emitter generates less oxygen. When the water is warmer and therefore hold less oxygen, the duration of off time is shorter. Thus the device is self-controlled to use power most economically. FIG. 3 shows a block diagram of a timer control with anode 1, cathode 2, thermistor temperature sensor 3, timer control circuit 4 and wire from a direct current power source 5.

EXAMPLE 2

Measurement of $O_2$ Bubbles

Attempts were made to measure the diameter of the $O_2$ bubbles emitted by the device of Example 1. In the case of particles other than gasses, measurements can easily be made by scanning electron microscopy, but gasses do not survive electron microscopy. Large bubble may be measured by pore exclusion, for example, which is also not feasible when measuring a gas bubble. A black and white digital, high contrast, backlit photograph of treated water with a millimeter scale reference was shot of water produced by the emitter of Example 1. About 125 bubbles were seen in the area selected for measurement. Seven bubbles ranging from the smallest clearly seen to the largest were measured. The area was enlarged, giving a scale multiplier of 0.029412.

Recorded bubble diameters at scale were 0.16, 0.22, 0.35, 0.51, 0.76, 0.88 and 1.09 millimeters. The last three were considered outliers by reverse analysis of variance and were assumed to be hydrogen bubbles. When multiplied by the scale multiplier, the assumed $O_2$ bubbles were found to range from 4.7 to 15 microns in diameter. This test was limited by the resolution of the camera and smaller bubbles in the nanometer range could not be resolved. It is known that white light cannot resolve features in the nanometer size range, so monochromatic laser light may give resolution sensitive enough to measure smaller bubbles. Efforts continue to increase the sensitivity of measurement so that sub-micron diameter bubbles can be measured.

EXAMPLE 3

Other Models of Oxygen Emitter

Figure 4:
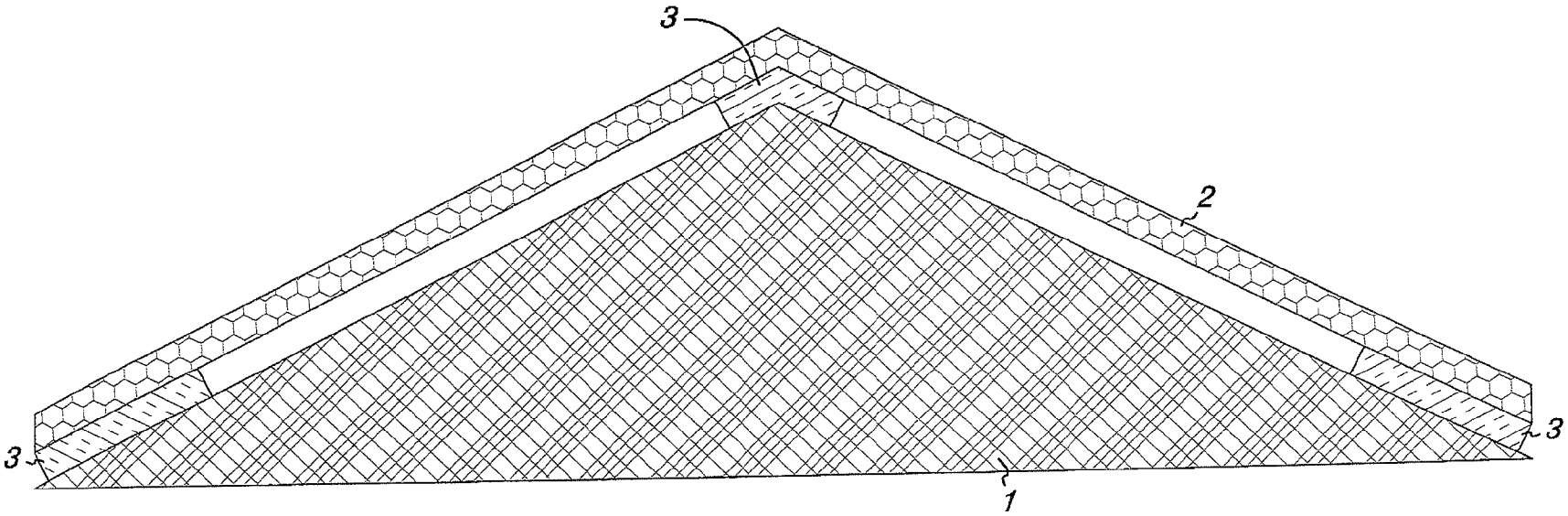
FIG. 4 shows a funnel or pyramid variation of the $O_2$ emitter.

Depending on the volume of fluid to be oxygenated, the oxygen emitter of this invention may be shaped as a circle, rectangle, cone or other model. One or more may be set in a substrate that may be metal, glass, plastic or other material. The substrate is not critical as long as the current is isolated to the electrodes by the nonconductor spacer material of a thickness from 0.005 to 0.075 inches, preferably 0.050 inches. It has been noticed that the flow of water seems to be at the periphery of the emitter, while the evolved visible bubbles ($H_2$) arise at the center of the emitter. Therefore, a funnel or pyramidal shaped emitter was constructed to treat larger volumes of fluid. FIG. 4 is a cross sectional diagram of such an emitter. The anode 1 is formed as an open grid separated from a marine grade stainless steel screen cathode 2 by the critical distance by spacer 3 around the periphery of the emitter and at the apex. This flow-through embodiment is suitable for treating large volumes of water rapidly.

The size may be varied as required. A round emitter for oxygenating a bait bucket may be about 2 inches in diameter, while a 3-inch diameter emitter is adequate for oxygenating a 10 to 40 gallon tank. The live well of a fishing boat will generally hold 40 to 80 gallons of water and require a 4-inch diameter emitter. It is within the scope of this invention to construct larger emitters or to use several in a series to oxygenate larger volumes. It is also within the scope of this invention to vary the model to provide for low voltage and amperage in cases where the need for oxygen is moderate and long lasting or conversely, to supersaturate water very quickly at higher voltage and amperage. In the special dimensions of the present invention, it has been found that a 6 volt battery supplying a current as low as 40 milliamperes is sufficient to generate oxygen. Such a model is especially useful with live plants or animals, while it is more convenient for industrial use to use a higher voltage and current. Table I shows a number of models suitable to various uses.

TABLE I

| Emitter Model | Gallons | Volts | Amps Max. | Ave | Watts |
|---|---|---|---|---|---|
| Bait keeper | 5 | 6 | 0.090 | 0.060 | 0.36 |
| Livewell | 32 | 12 | 0.180 | 0.120 | 1.44 |
| OEM 2 inch | 10 | 12 | 0.210 | 0.120 | 1.44 |
| Bait store | 70 | 12 | 0.180 | 0.180 | 2.16 |
| Double cycle | 2 | 12 | 0.180 | 0.180 | 2.16 |
| OEM 3 inch | 50 | 12 | 0.500 | 0.265 | 3.48 |
| OEM 4 inch | 80 | 12 | 0.980 | 0.410 | 4.92 |
| Water pail | 2 | 24 | 1.200 | 1.200 | 28.80 |
| Plate | 250 | 12 | 5.000 | 2.500 | 30.00 |

EXAMPLE 4

Multilayer Sandwich $O_2$ Emitter

Figure 5A:
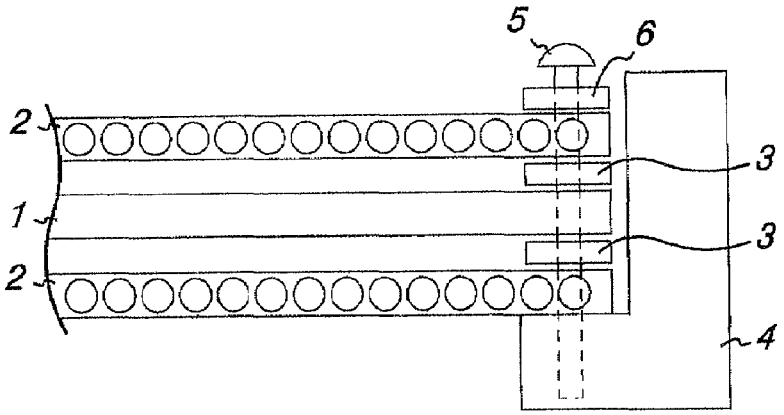
FIG. 5 shows a multilayer sandwich $O_2$ emitter.
Figure 5B:
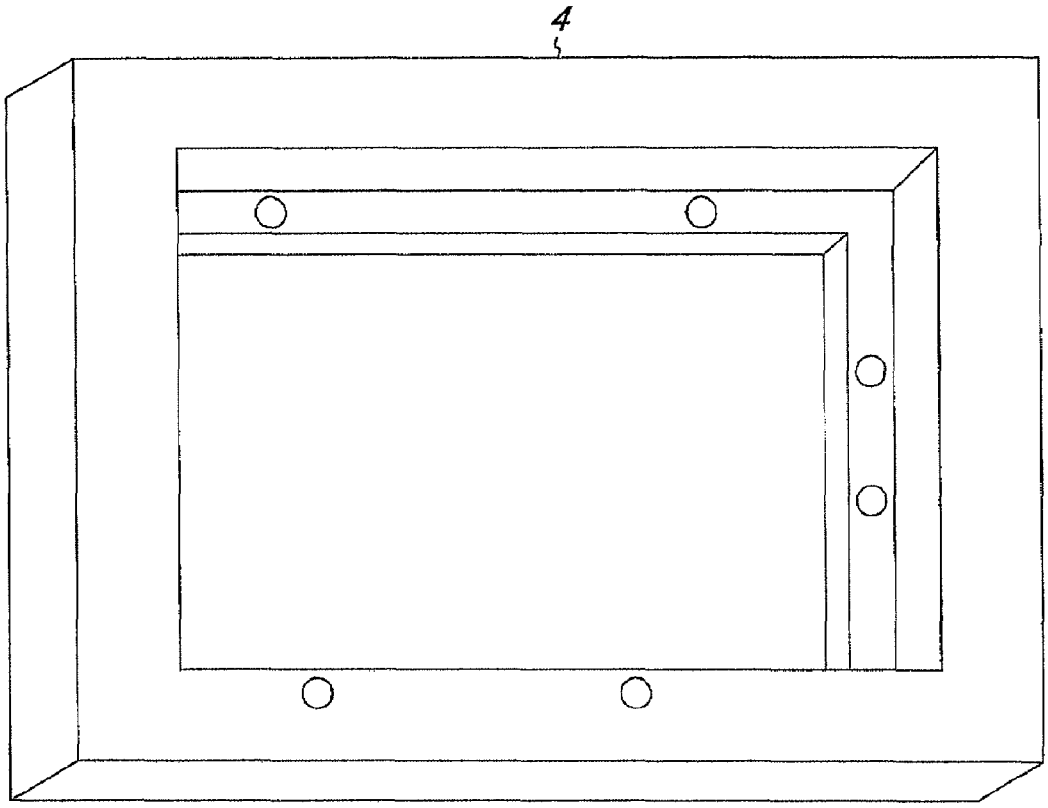

An $O_2$ emitter was made in a multilayer sandwich embodiment. (FIG. 5) An iridium oxide coated platinum anode 1 was formed into a grid to allow good water flow and sandwiched between two stainless steel screen cathodes 2. Spacing was held at the critical distance by nylon spacers 3. The embodiment illustrated is held in a cassette 4 which is secured by nylon bolt 5 with a nylon washer 6. The dimensions selected were:

| | |
|---|---|
| cathode screen | 0.045 inches thick |
| nylon spacer | 0.053 inches thick |
| anode grid | 0.035 inches thick |
| nylon spacer | 0.053 inches thick |
| cathode screen | 0.045 inches thick, |

for an overall emitter thickness of 0.231 inches thick inches.

If a more powerful emitter is desired, it is within the scope of this invention to repeat the sequence of stacking. For example, an embodiment may easily be constructed with this sequence: cathode, spacer, anode, spacer, cathode, spacer, anode, spacer, cathode, spacer, anode, spacer, cathode. The number of layers in the sandwich is limited only by the power requirements acceptable for an application.

EXAMPLE 5

Effect of Superoxygenated Water on the Growth of Plants

It is known that oxygen is important for the growth of plants. Although plants evolve oxygen during photosynthesis, they also have a requirement for oxygen for respiration. Oxygen is evolved in the leaves of the plants, while often the roots are in a hypoxic environment without enough oxygen to support optimum respiration, which can be reflected in less than optimum growth and nutrient utilization. Hydroponically grown plants are particularly susceptible to oxygen deficit in the root system. U.S. Pat. No. 5,887,383 describes a liquid supply pump unit for hydroponic cultures which attain oxygen enrichment by sparging with air. Such a method has high energy requirements and is noisy. Furthermore, while suitable for self-contained hydroponic culture, the apparatus is not usable for field irrigation. In a report available on the web, it was shown that hydroponically grown cucumbers and tomatoes supplied with water oxygenated with a device similar to that described in the '429 patent had increased biomass of about 12% and 17% respectively. It should be noted that when sparged with air, the water may become saturated with oxygen, but it is unlikely that the water is superoxygenated.

A. Superoxygenated Water in Hydroponic Culture.

Two small hydroponic systems were set up to grow two tomato plants. Circulation protocols were identical except that the 2 ½ gallon water reservoir for the Control plant was eroated with and aquarium bubbler and that for the Test plant was oxygenated with a five-inch strip emitter for two minutes prior to pumping. The cycle was set at four minutes of pumping, followed by four minutes of rest. The control water had an oxygen content of about 97% to 103% saturation, that is, it was saturated with oxygen. The test water had an oxygen content of about 153% to 165% saturation, that is, it was supersaturated. The test plant was at least four times the volume of the control plant and began to show what looked like fertilizer burn. At that point the fertilizer for the Test plant was reduced by half. Since the plants were not exposed to natural light but to continuous artificial light in an indoor environment without the natural means of fertilization (wind and/or insects), the experiment was discontinued after three months. At that time, the Test plant but not the Control plant had blossomed.

B. Superoxygenated Water in Field Culture.

A pilot study was designed to ascertain that plants outside the hydroponic culture facility would benefit from the application of oxygen. It was decided to use water treated with the emitter of Example 1 as the oxygen carrier. Since water so treated is supersaturated, it is an excellent carrier of oxygen.

Tomato seeds (Burpee "Big Boy") were planted in one-inch diameter peat and dirt plugs encased in cheese cloth and placed in a tray in a southwest window. Controls were watered once a day with tap water ("Control") or oxygenated water ("Test"). Both Controls and Test sprouted at one week. After five weeks, the Test plants were an average of 11 inches tall while the Controls were an average of nine inches tall. At this time, May 10, when the threat of frost in Minnesota was minimal, the plants were transplanted to 13 inch diameter pots with drainage holes. Four inches of top soil was added to each pot, topped off with four inches of Scott's Potting Soil. The pots were placed outside in a sunny area with at least eight hours a day of full sun. The plants were watered as needed with either plain tap water (Control) or oxygenated water (Test). The oxygenated water was produced by use of the emitter of Example 1 run for one-half hour in a five-gallon container of water. Previous experiments showed that water thus treated had an oxygen content from 160% to 260% saturation. The Test plants flowered on June 4, while the Controls did not flower until June 18. For both groups, every plant in the group first had flowers on the same day. All plants were fertilized on July 2 and a soaker hose provided because the plants were now so big that watering by hand was difficult. The soaker hose was run for one half to one hour each morning, depending on the weather, to a point at which the soil was saturated with water. One half hour after the soaker hose was turned off, about 750 ml of superoxygenated water was applied to each of the Test plants.

The Test plants were bushier than the Controls although the heights were similar. At this time, there were eight Control plants and seven Test plants because one of the Test plants broke in a storm. On July 2, the control plants averaged about 17 primary branches from the vine stem, while the control plants averaged about 13 primary branches from the vine stem. As the tomatoes matured, each was weighed on a kitchen scale at harvest. The yield history is shown in Table II.

TABLE II

| Week of: | Control, grams tomatoes from eight plants/cumulative total | | Test, grams tomatoes from seven plants/cumulative total | |
|---|---|---|---|---|
| July 27 | 240 | | 400 | |
| August 3 | 180 | 420 | 2910 | 3310 |
| August 10 | 905 | 1325 | 1830 | 5140 |
| August 17 | 410 | 1735 | 2590 | 7730 |
| August 24 | 3300 | 5035 | 2470 | 10200 |
| August 31 | 4150 | 9175 | 1580 | 11780 |
| September 15 | not weighed | | 3710 | 15490 |
| Final Harvest September 24 | 6435 | 15620 | 8895 | 24385 |

The total yield for the eight Control plants was 15620 grams or 1952 grams of tomatoes per plant.

The total yield for the seven Test plants was 24385 grams or 3484 grams of tomatoes per plant, an increase in yield of about 79% over the Control plants.

Figure 6:
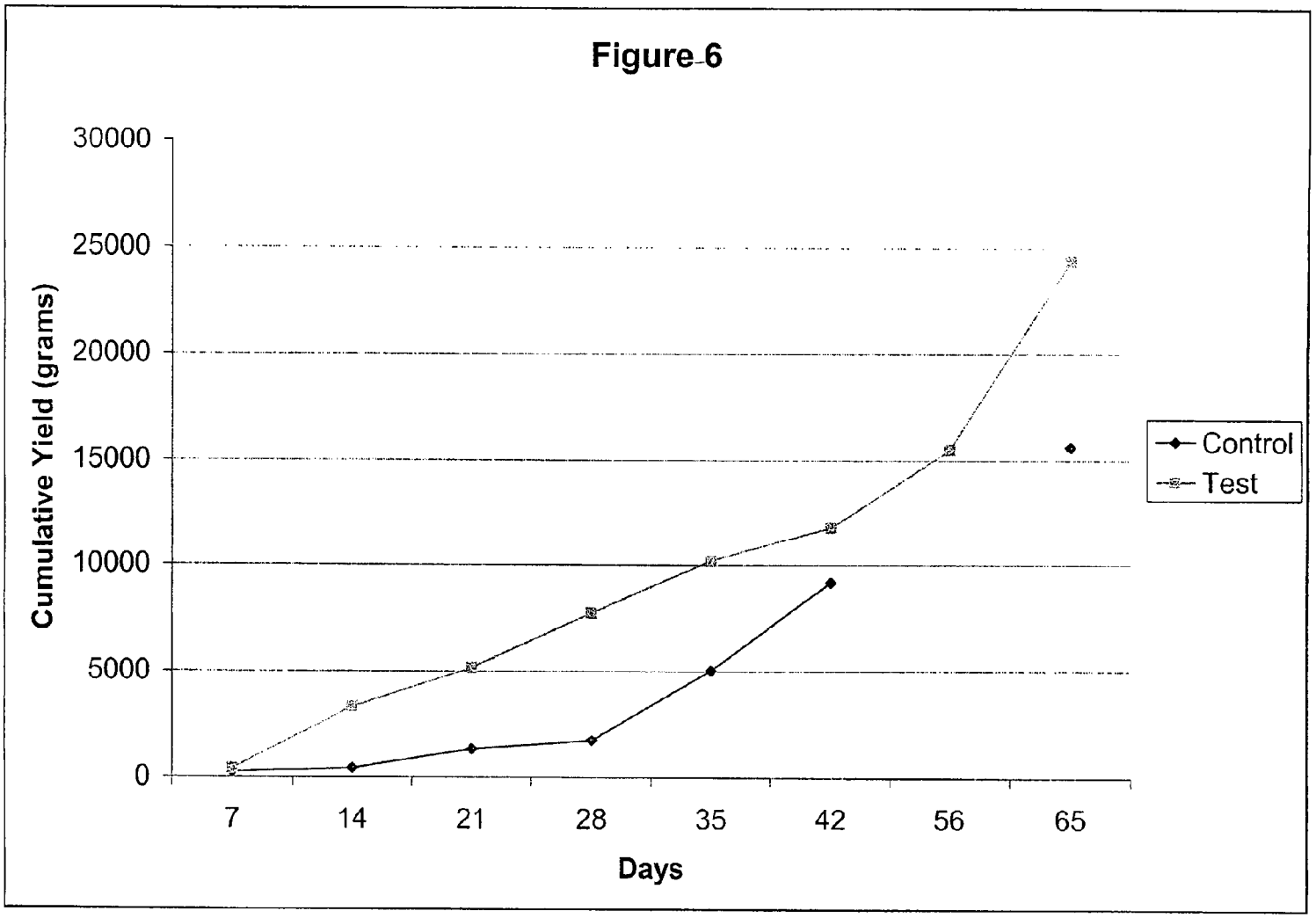
FIG. 6 shows the yield of tomato plants watered with superoxygenated water.

FIG. 6 shows the cumulative total as plotted against time. Not only did the Test plants blossom and bear fruit earlier, but that the Control plants never caught up to the test plants in the short Minnesota growing season. It should be noted that the experiment was terminated because of predicted frost. All fruits, both green and red, were harvested and weighed at that point.

EXAMPLE 6

Flow-Through Emitter for Agricultural Use

Figure 7A:
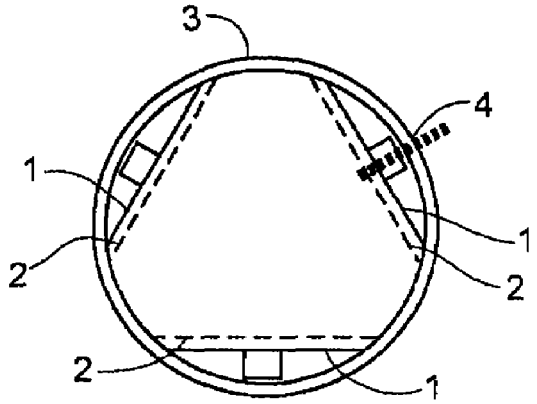
FIG. 7A is a cross section showing arrangement of three plate electrodes.
Figure 7B:
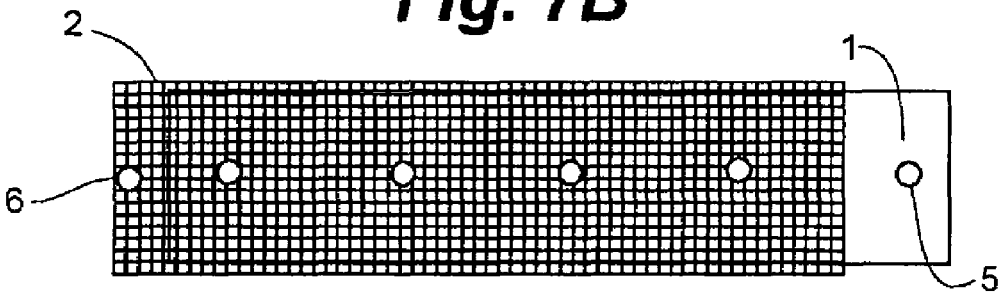
FIG. 7B is a longitudinal section showing the points of connection to the power source.

In order to apply the findings of example 5 to agricultural uses, an emitter than can oxygenate running water efficiently was developed. In FIG. 7(A), the oxygenation chamber is comprised of three anodes 1 and cathodes 2, of appropriate size to fit inside a tube or hose and separated by the critical distance are placed within a tube or hose 3 at 120° angles to each other. The anodes and cathodes are positioned with stabilizing hardware 4. The stabilizing hardware, which can be any configuration such as a screw, rod or washer, is preferably formed from stainless steel. FIG. 7(B) shows a plan view of the oxygenation chamber with stabilizing hardware 4 serving as a connector to the power source and stabilizing hardware 5 serving as a connector to the power source. The active area is shown at 6.

This invention is not limited to the design selected for this embodiment. Those skilled in the art can readily fabricate any of the emitters shown in FIG. 4 or 5, or can design other embodiments that will oxygenate flowing water. One useful embodiment is the "T" model, wherein the emitter unit is set in a side arm. The emitted bubbles are swept into the water flow. The unit is detachable for easy servicing. Table III shows several models of flow through emitters. The voltage and flowrates were held constant and the current varied. The Dissolved oxygen (DO) from the source was 7.1 mg/liter. The starting temperature was 12.2° C. but the flowing water cooled slightly to 11 or 11.5° C. Without undue experimentation, anyone may easily select the embodiment that best suits desired characteristics from Table III or designed with the teachings of Table III.

TABLE III

| MODEL | ACTIVE ELECTRODE AREA, SQ. IN. | VOLTAGE | CURRENT, AMPS. | FLOW RATE GAL/MINUTE | DO OF* SAMPLE AT ONE MINUTE |
|---|---|---|---|---|---|
| 2-Inch "T" | 2 | 28.3 | 0.72 | 12 | N/A |
| 3-inch "T" | 3 | 28.3 | 1.75 | 12 | N/A |
| 2-plate Tube | 20 | 28.3 | 9.1 | 12 | 8.4 |
| 3-Plate tube | 30 | 28.3 | 12.8 | 12 | 9.6 |

*As the apparatus runs longer, the flowing water becomes milky, indicating supersaturation. The one-minute time point shows the rapid increase in oxygenation.

The following plants will be tested for response to superoxygenated water: grape vines, lettuce, and radishes in three different climate zones. The operators for these facilities will be supplied with units for drip irrigation. Drip irrigation is a technique wherein water is pumped through a pipe or hose with perforations at the site of each plant to be irrigated. The conduit may be underground or above ground. Since the water is applied directly to the plant rather than wetting the entire field, this technique is especially useful in arid climates or for plants requiring high fertilizer applications.

The superoxygenated water will be applied by drip irrigation per the usual protocol for the respective plants. Growth and yield will be compared to the same plants given only the usual irrigation water. Pest control and fertilization will be the same between test and control plants, except that the operators of the experiments will be cautioned to be aware of the possibility of fertilizer burn in the test plants and to adjust their protocols accordingly.

It is expected that the superoxygenated plants with drip irrigation will show more improved performance with more continuous application of oxygen than did the tomato plants of Example 5, which were given superoxygenated water only once a day.

EXAMPLE 7

Treatment of Waste Water

Waste water, with a high organic content, has a high BOD, due to the bacterial flora. It is desirable to raise the oxygen content of the waste water in order to cause the flora to flocculate. However, it is very difficult to effectively oxygenate such water. Using a 4 inch OEM (see Table I) with a 12 volt battery, four liters of waste water in a five gallon pail were oxygenated. As shown in FIG. 8, the dissolved oxygen went from 0.5 mg/l to 10.8 mg/l in nine minutes.

Those skilled in the art will readily comprehend that variations, modifications and additions may in the embodiments described herein may be made. Therefore, such variations, modifications and additions are within the scope of the appended claims.

The invention claimed is:

1. A method for treating waste water comprising;

providing a flow-through oxygenator comprising an emitter for electrolytic generation of microbubbles of oxygen comprising an anode separated at a critical distance from a cathode and a power source all in electrical communication with each other, placing the emitter within a conduit; and passing waste water through the conduit.

[2. An emitter for electrolytic generation of microbubbles of oxygen in an aqueous medium comprising: an anode separated at a critical distance from a cathode, a nonconductive spacer maintaining the separation of the anode and cathode, the nonconductive spacer having a spacer thickness between 0.005 to 0.050 inches such that the critical distance is less than 0.060 inches and a power source all in electrical communication with each other, wherein the critical distance results in the formation of oxygen bubbles having a bubble diameter less than 0.0006 inches, said oxygen bubbles being incapable of breaking the surface tension of the aqueous medium such that said aqueous medium is supersaturated with oxygen.]

[3. The emitter of claim 2, wherein the anode is a metal or a metallic oxide or a combination of a metal and a metallic oxide.]

[4. The emitter of claim 2, wherein the anode is platinum and iridium oxide on a support.]

[5. The emitter of claim 2, wherein the cathode is a metal or metallic oxide or a combination of a metal and a metallic oxide.]

[6. The emitter of claim 2, wherein the critical distance is 0.005 to 0.060 inches.]

[7. The emitter of claim 2, comprising a plurality of anodes separated at the critical distance from a plurality of cathodes.]

[8. A method for oxygenating a non-native habitat for temporarily keeping aquatic animals, comprising:

inserting the emitter of claim 2 into the aqueous medium, the non-native habitat comprising an aquarium, a bait bucket or a live well.]

[9. A method for lowering the biologic oxygen demand of polluted water comprising:

passing the polluted water through a vessel containing the emitter of claim 2.]

[10. A supersaturated aqueous product formed with the emitter of claim 2, the supersaturated aqueous product having an approximately neutral pH.]

[11. The emitter of claim 2, further comprising a timer control.]

[12. The emitter of claim 2, wherein the anode and cathode are arranged such that the emitter assumes a funnel or pyramidal shaped emitter.]

*13. A method for producing an oxygenated aqueous composition comprising:*

*flowing water at a flow rate no greater than 12 gallons per minute through an electrolysis emitter comprising an electrical power source electrically connected to an anode electrode and a cathode electrode contained in a tubular housing,*

*causing electricity to flow from the power source to the electrodes, and,*

*producing the composition comprising a suspension comprising oxygen microbubbles and nanobubbles in the water, the microbubbles and nanobubbles having a bubble diameter of less than 50 microns, wherein:*

*the anode electrode is separated at a critical distance from the cathode such that the critical distance is from 0.005 inches to 0.140 inches;*

*the power source produces a voltage no greater than about 28.3 volts and an amperage no greater than about 13 amps,*

*the tubular housing has an inlet and an outlet and a tubular flow axis from the inlet to the outlet;*

*the water flows in the inlet, out the outlet, is in fluid connection with the electrodes, and the water flowing into the inlet has a conductivity produced by the presence of dissolved solids such that the water supports plant or animal life.*

*14. A method according to claim 13 wherein the housing contains at least one anode and at least one cathode, the electrodes are of a grid or solid design and are relatively positioned in cross section along the radius of the tubular housing with their long axes substantially parallel to the tubular water flow axis of the housing.*

*15. A method according to claim 13 wherein the housing has a side arm positioned at an angle relative to the tubular flow axis and the electrodes are located in the side arm.*

*16. A method according to claim 15 wherein the side arm contains a multiple number of anode and cathode electrodes and the electrodes are plate shaped.*

*17. A method according to claim 14 wherein a multiple number of anode and cathodes are present and are of grid or solid design.*

*18. A method according to claim 13 wherein the water has a temperature no greater than about ambient temperature at the inlet and the water temperature is a factor for formation of the suspension.*

*19. A method according to claim 13 wherein the microbubbles and nanobubbles remain in the water at least in part for a period up to several hours.*

*20. A method according to claim 19 wherein the period for which the microbubbles and nanobubbles at least in part remain in the water is determined by containing the water with microbubbles and nanobubbles in a two and one half gallon aquarium reservoir container.*

*21. A method according to claim 13 wherein the microbubbles and nanobubbles supersaturate the water.*

*22. A method according to claim 13 wherein the bubble diameter of the microbubbles and nanobubbles is less than 0.0006 inches.*

*23. A method according to claim 13 wherein the separation of electrodes is maintained by a nonconductive spacer.*

*24. A method according to claim 13 wherein the electrode separation distance is about 0.045 to about 0.06 inches.*

*25. A method according to claim 13 wherein the microbubbles and nanobubbles are substantially incapable of breaking the surface tension of the water.*

*26. A method according to claim 13 wherein each anode and cathode electrode of the emitter is positioned so that substantially all points midway between opposing anode and cathode electrodes are closer to a surface of the tubular housing than to a center point within the tubular housing.*

*27. A method according to claim 26 wherein each anode and cathode electrode of the emitter are positioned so that the electrodes do not obstruct a water flow passage along the center of the tubular housing.*

* * * * *